UNITED STATES PATENT OFFICE.

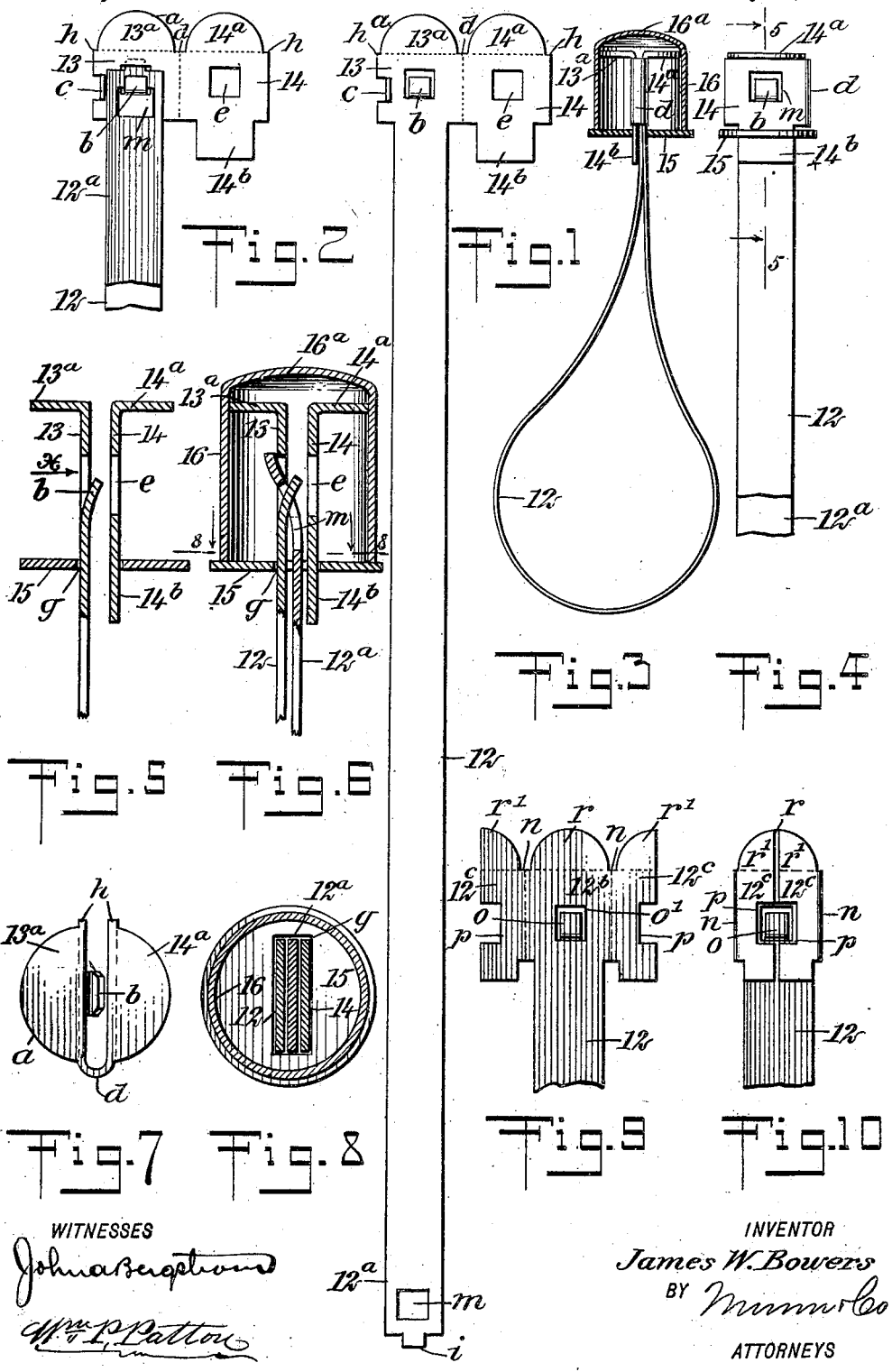

JAMES W. BOWERS, OF SEYMOUR, INDIANA, ASSIGNOR TO ELISHA T. CARMICHAEL, OF COLUMBUS, OHIO.

CAR-SEAL.

No. 922,251.  Specification of Letters Patent.  Patented May 18, 1909.

Application filed October 24, 1908. Serial No. 459,284.

*To all whom it may concern:*

Be it known that I, JAMES W. BOWERS, a citizen of the United States, and a resident of Seymour, in the county of Jackson and State of Indiana, have invented a new and Improved Car-Seal, of which the following is a full, clear, and exact description.

This invention relates to metallic seals for preventing the unwarranted opening of freight car doors without exposure, and has for its object to provide novel details of construction for a car door seal which afford a simple, strong and conveniently applied seal that cannot be detached unless broken.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a plan view of a plate metal strip that constitutes the securing band for the seal, and of integral locking means formed on the ends of said strip that are details of the invention; Fig. 2 is a side view of the end portions of the securing band lapped together, and the locking means on said ends interlocked with each other; Fig. 3 is a partly sectional side view of the improved seal, showing the parts thereof locked together at the lapped ends of these curing band; Fig. 4 is a side view of details, seen in the direction of the arrow $x$ in Fig. 5, parts of the seal being removed; Fig. 5 is a longitudinal sectional view, substantially on the line 5—5 in Fig. 4; Fig. 6 is a longitudinal sectional view of details of the locking means complete, and shown in interlocked connection, and an inclosing case therefor; Fig. 7 is a plan view of the details shown in Fig. 5; Fig. 8 is a sectional plan view of parts, the section being taken substantially on the line 8—8 in Fig. 6; Fig. 9 is a side view of a modified form of the locking means formed on one end of a securing band, before the side wings are folded; and Fig. 10 is a side view of the modification shown in Fig. 9, showing the side wings thereof in folded condition.

In this class of car door seals, a wire strand or narrow strip of plate metal is employed for connecting two staples or the like, respectively projected from an edge portion of a slidable car door and the side jamb of an opening in the car body that is closed by the door, means of various constructions being provided for securing the ends of the strip together and thus sealing the car door.

Referring to the drawings, 12 represents a strip of plate metal, that with advantage may be resilient, and of such thickness as will permit said strip to be readily bent as shown in Fig. 1.

Upon one end of the strip 12, a locking head is formed, the preferred construction of which is shown in Figs. 1 to 8 inclusive, and as clearly represented in Figs. 1 and 2, said head consists of a plate metal enlargement 13 that is substantially rectangular but upon the end opposite from the strip 12, a wing $13^a$ is extended, having a nearly semicircular defining edge $a$.

A short rectangular tongue $b$ is integrally formed centrally in the head of the strip 12 by the removal of material around three edges of said tongue, and opposite the tongue, in a free side edge of the head plate, an integral flange $c$ is formed by slitting the material of said head plate at two adjacent points and bending the material left standing between the slits, at a right angle.

From the side edge of the head plate 13 that is opposite that whereon the flange $b$ is formed, a duplicate head plate 14 is joined to the plate 13 by an integral web $d$, this lateral extension having a wing $14^a$ formed thereon that is projected in the same direction and at one side from the wing $13^a$ and like it has a circular edge.

From the edge of the head plate 14 that is opposite the wing $14^a$, a flange $14^b$ is extended, having a rectangular contour, and centrally in the head plate 14 a rectangular opening $e$ is formed.

To adapt the duplicate head plates 13, 14, for service, the head plate 14 is folded toward the other head plate 13, but is held spaced therefrom and parallel therewith by the web $d$, and as is clearly shown in Fig. 5, the tongue $b$ is bent so as to approach the opening $e$, and in the same view it will be noted that the depending flange $14^b$ is disposed parallel with and spaced from the strip 12.

In the further construction of the locking head, a circular disk 15, having a rectangular slot $g$ formed centrally therein, is slid down over the sections 13 and 14 and located below said tongue. The wings $13^a$, $14^a$, are now bent oppositely at right angles with the head plates 13, 14 on which they are formed, thus disposing them in the same plane, and over said wings a case 16 of sheet metal, having a cylindrical side wall, and a top wall $16^a$, is downwardly passed. The side edges $h$ of the head plates 13, 14, project slightly outside of the defining edges on the wings $13^a$, $14^a$, and said edges $h$ have enforced engagement with the inner surface of the case 16, thus disposing the head plates substantially central therein.

The disk 15, which projects slightly outside of the case side wall 16 when seated upon the lower edge thereof, is soldered or otherwise secured thereupon, and the member of the looped securing strip 12 having the head plate 13 thereon, is secured in the slot $g$ along one side edge thereof. The opposite end $12^a$ of the securing strip 12 is furnished with a tongue $i$ having less width than the opening in the head plate 13 around the tongue $b$, and in said end portion $12^a$ of the strip a rectangular aperture $m$ is formed centrally and near the tongue $i$. The free end $12^a$ of the strip 12 is bent as shown in Fig. 6 so that the tongue $i$ can engage behind the wall of the opening in the plate 13.

In applying the sealing device for detection of an improper opening of a car door, the free end $12^a$ of the securing strip 12 is first passed through the staples that are provided to receive the same when the car door is closed, and inserted in the slot $g$ between the depending flange $14^b$ and the secured end portion of the strip 12. Upon insertion of the tongue $i$ forcibly, it will be guided by the flange $c$ and press the tongue $b$, so that the free end of said tongue $i$ will pass above the tongue $b$ into the opening around the latter, which will permit the tongue $b$ to enter the opening $m$ in the end portion $12^a$ of the securing strip 12 and resume its bent form, as shown in Fig. 6.

It will be seen that the interlocked connection of the tongue $b$ with the end portion $12^a$ of the securing strip 12, will prevent the withdrawal of said end from within the case 16, and as said case is closed at both ends, it will not be possible to release the car door without breaking some part of the improved seal.

The modified construction of the locking head, shown in Figs. 9 and 10, is substantially the same as that already described, the variation in shape consisting in forming two similar wing plates $12^c$ on a central head plate $12^b$ from which said wings are spaced by two similar webs $n$, $n$. Obviously when the wings $12^c$ are folded toward each other from the opposite side edges of the head plate $12^b$ and disposed parallel therewith by the webs $n$, $n$, the pair of wings $12^c$ are in service the equivalents of the wing plate $14^a$ shown in Fig. 1.

To adapt the locking head just mentioned for service, the central head plate $12^b$ is centrally apertured as at $o'$, leaving a tongue $o$ remain intact, the function of which is the same as that of the tongue $b$, and in the side edges of the wings $12^c$, similar rectangular notches $p$ are formed, that produce a rectangular opening opposite the tongue $o$, to permit the free insertion of the free end of the portion $12^a$ of the locking strip into engagement with said tongue $o$. A convex-edged wing $r$ is formed on the upper edge of the central head plate $12^b$, and on each lateral wing $12^c$ the half portion $r'$ of a wing similar to the wing $r$ is formed.

It will be seen that when the wing $r$ and half portions $r'$ of a similar wing are bent outward at a right angle, a detail substantially similar to the wings $13^a$, $14^a$, is provided, having a like function when inserted into a case such as the case 16.

Having thus described my invention, I claim as new and desire to secure by Letters Patent:

1. In a car seal, a casing, a metal strip, and a locking head on one end of the strip formed in spaced sections and arranged in said casing, one section of the head having a tongue bent toward the other section which is provided with an opening, the other end of the strip terminating in a tongue and having an opening therein near the said tongue, the tongues respectively interlocking with the edge of the slot in one section and the slot in the end of the strip when said end is inserted between the spaced head sections.

2. In a car seal, a casing, a resilient plate metal strip, and a locking head on one end of said strip formed in two sections spaced by a web at one side edge thereof and arranged in said casing, one section having an integral and upwardly projecting and outwardly extending tongue and the other section having an opening opposite the tongue, the other end of the strip terminating in a reduced tongue and having an opening therein near said tongue, the tongues respectively interlocking with the edge of a slot in one section and the slot in the end of the strip when said end is inserted between the spaced head sections.

3. In a car seal, a resilient plate metal strip having a tongue on one end, and an opening near said tongue, the opposite end of the strip comprising two substantially similar head sections, each section having a wing that is curved on the edge and bent outwardly, a web wall joining the sections that are spaced apart thereby, one section having a tongue formed thereon and bent toward the other section, the opening in the opposite end of the strip receiving said tongue and the tongue on said end of the strip passing into the opening that is around the other tongue when the free end of the strip and tongue thereon is inserted between the head sections, and a case that incloses the head sections.

In testimony whereof I have signed my name to this specification in the presence of two subscribing witnesses.

JAMES W. BOWERS.

Witnesses:
F. W. FEHRING,
GEORGE SCHOOLER.

Correction in Letters Patent No. 922,251.

It is hereby certified that the residence of the assignee in Letters Patent No. 922,251, granted May 18, 1909, upon the application of James W. Bowers, of Seymour, Indiana, for an improvement in "Car-Seals," was erroneously written and printed "Columbus, Ohio," whereas said residence should have been written and printed *Columbus, Indiana;* and that the said Letters Patent should be read with this correction therein that the same may conform to the record of the case in the Patent Office.

Signed and sealed this 15th day of June, A. D., 1909.

[SEAL.]

C. C. BILLINGS,
*Acting Commissioner of Patents.*